US012154425B2

(12) United States Patent
Nallaperumal

(10) Patent No.: US 12,154,425 B2
(45) Date of Patent: Nov. 26, 2024

(54) METHOD FOR HUSHING FIRE DETECTORS

(71) Applicant: Carrier Corporation, Palm Beach Gardens, FL (US)

(72) Inventor: Pirammanayagam Nallaperumal, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 61 days.

(21) Appl. No.: 18/147,221

(22) Filed: Dec. 28, 2022

(65) Prior Publication Data

US 2023/0206746 A1 Jun. 29, 2023

Related U.S. Application Data

(60) Provisional application No. 63/294,145, filed on Dec. 28, 2021.

(51) Int. Cl.
*G08B 25/00* (2006.01)
*G08B 17/06* (2006.01)
*G08B 25/10* (2006.01)

(52) U.S. Cl.
CPC ........... *G08B 25/008* (2013.01); *G08B 17/06* (2013.01); *G08B 25/10* (2013.01)

(58) Field of Classification Search
CPC ...... G08B 25/008; G08B 17/06; G08B 25/10; G08B 25/001
See application file for complete search history.

(56) References Cited

U.S. PATENT DOCUMENTS 6,624,750 B1 9/2003 Marman et al.
6,642,849 B1 11/2003 Kondziolka
(Continued)

FOREIGN PATENT DOCUMENTS

AU 2018100000 A4 2/2018
CN 202257835 U 5/2012
(Continued)

OTHER PUBLICATIONS

Author Unknown; "Silence Nest Protect", Google Nest Help, 2022, 3 Pages. https://support.google.com/googlenest/answer/9249356?hl=en&co=GENIE.Platform=Android&visit_id=638077735804862022-2153682256&rd=1.

*Primary Examiner* — John A Tweel, Jr.
(74) *Attorney, Agent, or Firm* — CANTOR COLBURN LLP

(57) ABSTRACT

A method of hushing one or more fire detectors of a fire detector system including: receiving an alert using a computer application of a trusted individual computing device, the alert indicating that fire has been detected by at least one of the one or more fire detectors; searching for a wireless advertisement emitted from the one or more fire detectors in response to the alert using the computer application; detecting the wireless advertisement being emitted from the one or more fire detectors using the computer application; and receiving a manual input via an input device of the trusted individual computing device to hush the fire detector from a trusted individual in possession of the trusted individual computing device; and transmitting a hush request to the one of the one or more fire detectors in response to the manual input using the computer application.

20 Claims, 2 Drawing Sheets

(56) References Cited

U.S. PATENT DOCUMENTS

| | | | | |
|---|---|---|---|---|
| 6,753,786 | B1 * | 6/2004 | Apperson | G08B 29/145 340/630 |
| 6,975,223 | B1 * | 12/2005 | Mladen | G08B 21/025 340/539.32 |
| 7,242,288 | B2 | 7/2007 | Kaiser et al. | |
| 7,265,678 | B2 | 9/2007 | Chapman et al. | |
| 8,847,772 | B2 | 9/2014 | Marks et al. | |
| 9,153,124 | B2 | 10/2015 | Watts et al. | |
| 9,640,061 | B1 * | 5/2017 | Klimanis | G08B 25/008 |
| 2007/0080819 | A1 * | 4/2007 | Marks | G08B 17/10 340/628 |

FOREIGN PATENT DOCUMENTS

| | | | |
|---|---|---|---|
| CN | 103093572 | A | 5/2013 |
| CN | 106600880 | A | 4/2017 |
| CN | 206991506 | U | 2/2018 |
| CN | 212302695 | U | 1/2021 |
| WO | 9423402 | | 10/1994 |
| WO | 2011078634 | A1 | 6/2011 |

* cited by examiner

METHOD FOR HUSHING FIRE DETECTORS

CROSS-REFERENCE TO RELATED APPLICATIONS

This claims the benefit of U.S. Provisional Application No. 63/294,145 filed Dec. 28, 2021, all of which are incorporated herein by reference in their entirety.

BACKGROUND

The embodiments herein generally relate to fire detectors and more specifically, a method and apparatus to coordinate access to fire detectors.

In some instances, fire detectors may activate when there is no actual fire present, such as, for example, when cooking. In order to hush fire detectors, physical buttons on the fire detectors typically have to be pressed manually by a person located in proximity to the fire detector.

BRIEF DESCRIPTION

According to one embodiment, a method of hushing one or more fire detectors of a fire detector system is provided. The method including: receiving an alert using a computer application of a trusted individual computing device, the alert indicating that fire has been detected by at least one of the one or more fire detectors; searching for a wireless advertisement emitted from the one or more fire detectors in response to the alert using the computer application of the trusted individual computing device; detecting the wireless advertisement being emitted from the one or more fire detectors using the computer application of the trusted individual computing device; and receiving a manual input via an input device of the trusted individual computing device to hush the fire detector from a trusted individual in possession of the trusted individual computing device; and transmitting a hush request to the one of the one or more fire detectors in response to the manual input using the computer application of the trusted individual computing device.

In addition to one or more of the features described above, or as an alternative, further embodiments of may include that the wireless advertisement is emitted from the one or more fire detectors using a short-range wireless signal.

In addition to one or more of the features described above, or as an alternative, further embodiments may include that the short-range wireless signal is Bluetooth or Bluetooth Low Energy.

In addition to one or more of the features described above, or as an alternative, further embodiments may include that the hush request is transmitted via an internet.

In addition to one or more of the features described above, or as an alternative, further embodiments may include that the hush request is transmitted via a Wi-Fi connection to the internet or a cellular connection to the internet.

In addition to one or more of the features described above, or as an alternative, further embodiments may include that the hush request is configured to silence an alarm that is being audibly or visually emitted by the one or more fire detectors.

In addition to one or more of the features described above, or as an alternative, further embodiments may include receiving authority from an occupant of a property where the one or more fired detectors are located to receive the alert and transmit the hush request, wherein the occupant of the property has granted the authority to the trusted individual in possession of the trusted individual computing device to receive the alert and transmit the hush request.

According to another embodiment, a fire detector system having one or more fire detectors is provided. The fire detector system including: a processor; and a memory including computer-executable instructions that, when executed by the processor, cause the processor to perform operations. The operations including: receiving an alert using a computer application of a trusted individual computing device, the alert indicating that fire has been detected by at least one of the one or more fire detectors; searching for a wireless advertisement emitted from the one or more fire detectors in response to the alert using the computer application of the trusted individual computing device; detecting the wireless advertisement being emitted from the one or more fire detectors using the computer application of the trusted individual computing device; receiving a manual input via an input device of the trusted individual computing device to hush the fire detector from a trusted individual in possession of the trusted individual computing device; and transmitting a hush request to the one of the one or more fire detectors in response to the manual input using the computer application of the trusted individual computing device.

In addition to one or more of the features described above, or as an alternative, further embodiments may include that the wireless advertisement is emitted from the one or more fire detectors using a short-range wireless signal.

In addition to one or more of the features described above, or as an alternative, further embodiments may include that the short-range wireless signal is Bluetooth or Bluetooth Low Energy.

In addition to one or more of the features described above, or as an alternative, further embodiments may include that the hush request is transmitted via an internet.

In addition to one or more of the features described above, or as an alternative, further embodiments may include that the hush request is transmitted via a Wi-Fi connection to the internet or a cellular connection to the internet.

In addition to one or more of the features described above, or as an alternative, further embodiments may include that the hush request is configured to silence an alarm that is being audibly or visually emitted by the one or more fire detectors.

In addition to one or more of the features described above, or as an alternative, further embodiments may include that the operations further include: receiving authority from a property where the one or more fired detectors are located to receive the alert and transmit the hush request, wherein the occupant of the property has granted the authority to the trusted individual in possession of the trusted individual computing device to receive the alert and transmit the hush request.

According to an embodiment, a computer program product tangibly embodied on a non-transitory computer readable medium is provided. The computer program product including instructions that, when executed by a processor, cause the processor to perform operations including: receiving an alert using a computer application of a trusted individual computing device, the alert indicating that fire has been detected by at least one of one or more fire detectors; searching for a wireless advertisement emitted from the one or more fire detectors in response to the alert using the computer application of the trusted individual computing device; detecting the wireless advertisement being emitted from the one or more fire detectors using the computer application of the trusted individual computing device; receiving a manual input via an input device of the trusted individual computing device to hush the fire detector from a trusted individual in possession of the trusted individual computing device; and transmitting a hush request to the one of the one or more fire detectors in response to the manual input using the computer application of the trusted individual computing device.

In addition to one or more of the features described above, or as an alternative, further embodiments may include that the wireless advertisement is emitted from the one or more fire detectors using a short-range wireless signal.

In addition to one or more of the features described above, or as an alternative, further embodiments may include that the short-range wireless signal is Bluetooth or Bluetooth Low Energy.

In addition to one or more of the features described above, or as an alternative, further embodiments may include that the hush request is transmitted via an internet.

In addition to one or more of the features described above, or as an alternative, further embodiments may include that the hush request is transmitted via a Wi-Fi connection to the internet or a cellular connection to the internet.

In addition to one or more of the features described above, or as an alternative, further embodiments may include that the hush request is configured to silence an alarm that is being audibly or visually emitted by the one or more fire detectors.

Technical effects of embodiments of the present disclosure include granting the authority to hush a fire detector of an occupant's property to a trusted individual.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As aforementioned, in some instances, fire detectors may activate when there is no actual fire present, such as, for example, when cooking. In order to hush fire detectors, physical buttons on the fire detectors typically have to be pressed manually by a person located in proximity to the fire detector. The embodiments disclosed herein relate to granting the ability to a trusted individual (e.g., trusted neighbor) to hush a fire detector in the event no fire is present, and an occupant of the property is unavailable to hush the fire detector.

Figure 1:
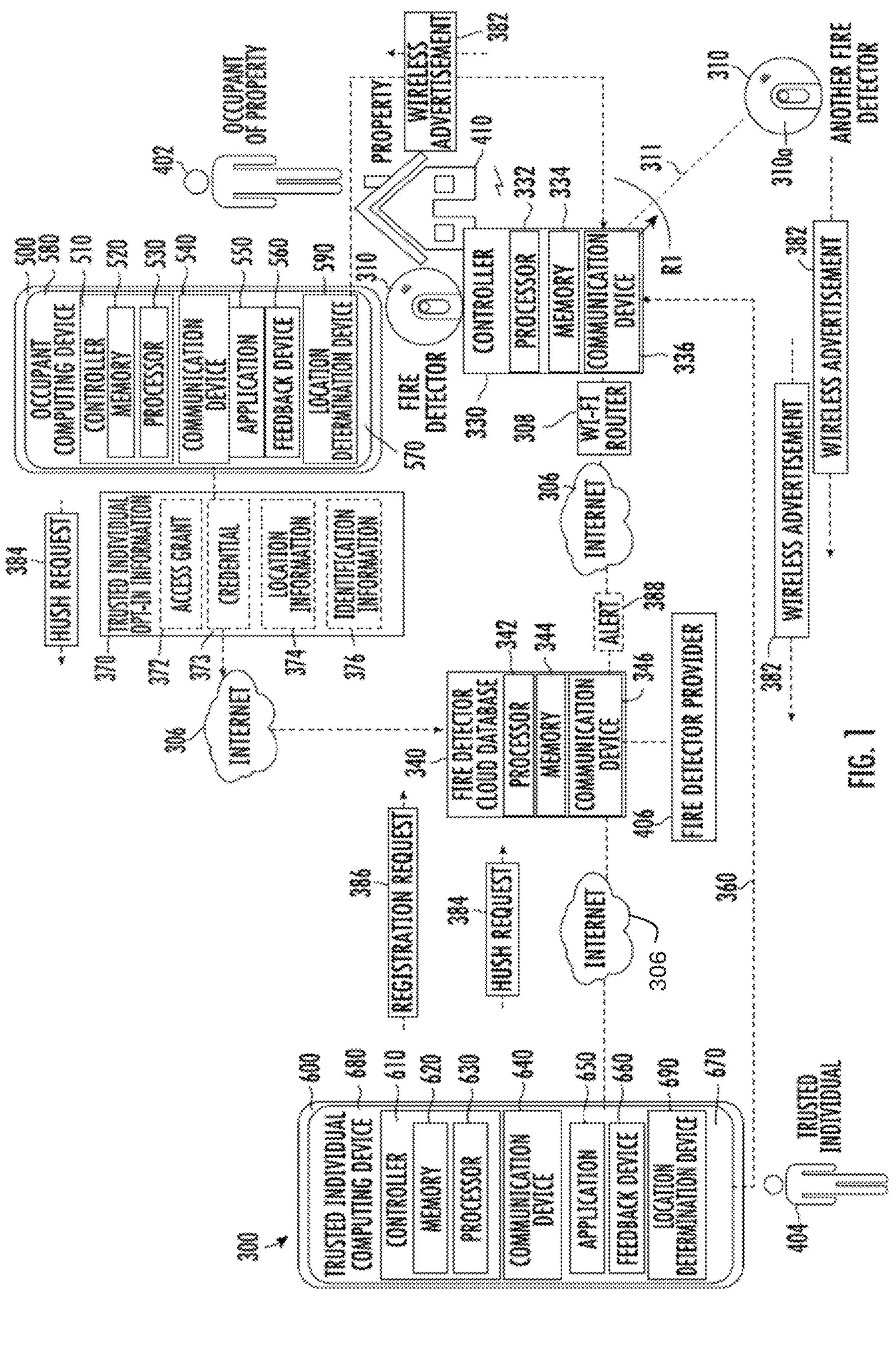
FIG. 1 is a schematic diagram of a fire detector system, according to an embodiment of the present disclosure.

Referring now to FIG. 1, a schematic diagram of a fire detector system 300 is illustrated, according to an embodiment of the present disclosure. It should be appreciated that, although particular systems are separately defined in the schematic block diagrams, each or any of the systems may be otherwise combined or separated via hardware and/or software.

The fire detector system 300 includes the fire detector cloud database 340, a fire detector 310, a first computer application 550 installed or accessible on an occupant computing device 500, and a second computer application 650 installed or accessible on a trusted individual computing device 600. It is understood that the first computer application 550 and the second computer application 650 may be the same mobile application but just installed on two different devices 500, 600 and/or accessible from the two different devices 500, 600. The first computer application 550 and the second computer application 650 may be accessible from two different devices 500, 600, such as, for example, a software-as-as service or a website. The first computer application 550 and the second computer application 650 may be in communication with the cloud database via the internet 306.

It is understood, that while only one fire detector 310 is illustrated at the property 410, the property 410 may have one or more fire detectors 310. The one or more fire detectors 310 may each be in communication with each other. When a fire is detected by one fire detector 310 all of the fire detectors may activate an alarm, a selected group of fire detectors 310 may activate any alarm, or all of the fire detectors 310 may activate an alarm.

The fire detector 310 is configured to detect the presence of a fire in and/or on the property 410. Upon detection of a fire, the fire detector 310 emits an alarm including lights and/or sound to alert those nearby of a possible fire. Additionally, upon detection of a fire, the fire detector 310 transmits an alert 388 to the occupant computing device 500 and/or the trusted individual computing device 600. Then the occupant computing device 500 and/or the trusted individual computing device 600 may transmit a hush request back to the fire detector 310 through a short-range wireless signal 360, including, but not limited to, Wi-Fi, Bluetooth, Bluetooth Low Energy (BLE), Ultra-Wideband, Zigbee, Z-Wave, Sub-GHz RF Channel, or any other wireless communication method known to one of skill in the art. The alert 388 may be configured to alert the occupant 402 and/or the trusted individual 404 to the potential presence of a fire at the property 410. The alert 388 may be displayed on the display device 580 of the occupant computing device 500 and/or the display device 680 of the trusted individual computing device 600. The alert 388 may activate a sound or vibration of the feedback device 560 of the occupant computing device 500 and/or the feedback device 660 of the trusted individual computing device 600

The alert 388 may be transmitted to the occupant computing device 500 and/or the trusted individual computing device 600 through the internet 306 and/or specifically through a Wi-Fi router 308 and then through the internet 306 to the occupant computing device 500 and/or the trusted individual computing device 600.

Once the alert 388 is received by the occupant computing device 500, the first computer application 550 may begin searching for a wireless advertisement 382 being emitted by the fire detector 310 via a short-range wireless signal 360. Once the alert 388 is received by the trusted individual computing device 600, the second computer application 650 may begin searching for a wireless advertisement 382 being emitted by the fire detector 310 via a short-range wireless signal 360. The wireless advertisement 382 may include identification information 376 of the fire detector 310, including but not limited to a serial number and/or ID of the fire detector 310. In the event that the fire detector system 300 includes two or more fire detectors 310, each fire detector 310 may emit the wireless advertisement 382 and not just the fire detector 310 that emitted the alert 388 or detected the fire. Detection of the short-range wireless signal 360 by the first computer application 550 would indicate that the occupant computing device 500 is within range of the fire detector 310. Detection of the short-range wireless signal 360 by the second computer application 650 would indicate that the trusted individual computing device 600 is within range of the fire detector 310. The short-range wireless signal 360 is capable of being emitted a selected range R1. The alert 388 may also be transmitted to other fire detectors 310*a* over a wired and/or wireless connection 311. The other fire detectors 310*a* may be configured to transmit the alert 388 to the internet 306. The other fire detectors 310*a* may also emit the wireless advertisement 382.

Once the alert 388 is received by an occupant computing device 500 within the selected range R1, then the trusted occupant computing device 500 may submit a hush request 384 to quiet the alarm emitted by the fire detector 310. The hush request 384 is configured to silence or stop an alarm that is being audibly or visually emitted by the one or more fire detectors 310.

Once the alert 388 is received by a trusted individual computing device 600 within the selected range R1, then the trusted individual computing device 600 may submit a hush request 384 to quiet the alarm emitted by the fire detector 310. The hush request 384 is configured to silence or stop an alarm that is being audibly or visually emitted by the one or more fire detectors 310.

The fire detector 310 may be a smoke detector, a $CO_2$ detector, a CO detector, a heat sensor, or any other fire detector known to one of skill in the art. The fire detector 310 may be an internet of things (IoT) connected device. The property 410 may be a home, an apartment, a garage, a room, a shed, a storage unit, a car, a vehicle, land, or any other area known to one of skill in the art that may need to be protected from fire. The property 410 may be owned by an occupant 402, rented by the occupant 402, in possession of an occupant 402, in control of the occupant 402, leased by the occupant 402, or mortgaged by the occupant 402. The occupant 402 may be a person, an organization, a group, a partnership, a company, or a corporation.

The fire detector 310 includes a controller 330 that is configured to communicate with the first computer application 550, the second computer application 650, and the fire detector cloud database 340. The controller 330 may be an electronic controller including a processor 332 and an associated memory 334 comprising computer-executable instructions (i.e., computer program product) that, when executed by the processor 332, cause the processor 332 to perform various operations. The processor 332 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 334 may be but is not limited to a random access memory (RAM), read only memory (ROM), or other electronic, optical, magnetic or any other computer readable medium.

The controller 330 also includes a communication device 336. The communication device 336 may be capable of wireless communication including but not limited to Wi-Fi, Bluetooth, BLE, Ultra-Wideband, Zigbee, Z-Wave, Sub-GHz RF Channel, cellular, satellite, or any other wireless signal known to one of skill in the art. The communication device 336 may be configured to communicate with the fire detector cloud database 340 through the internet 306. Alternatively, or additionally, the communication device 336 may be configured to communicate directly with the fire detector cloud database 340. The communication device 336 may be configured to communicate with another fire detector 310*a* over a wired and/or wireless connection 311.

The fire detector cloud database 340 may belong to and/or be managed by a fire detector provider 406, such as, for example a manufacture of the fire detector 310 or an aftermarket support company for the fire detector 310.

The fire detector cloud database 340 may be a database to control and coordinate the service provided by the fire detector provider 406 and communication/alarms from the fire detector 310. The fire detector provider 406 may coordinate authorizations between the occupant 402 and the trusted individual 404 regarding one or more fire detectors 310 present at the property 410. The authorizations may relate to hushing the fire detector 310. The fire detector provider 406 may be a person, an organization, a group, a partnership, a company, or a corporation.

The occupant computing device 500 may belong to or be in possession of an occupant 402 of the property 410. The trusted individual computing device 600 may belong to or be in possession of a trusted individual 404 to the property 410. The relationship between the occupant 402 and the trusted individual 404 may be established via the fire detector cloud database 340. The trusted individual 404 may be someone coming to the property 410 that is trusted by the occupant 402, may be present at the property 410, nearby the property 410, or visiting the property 410. The trusted individual 404 may be a neighbor of the occupant 402, a family member of the occupant 402, a real-estate agent showing the property 410 to a potential buyer, a potential buyer of the property 410, a delivery person delivering something to the property 410, a repair person service repairing something at the property 410, a painter painting something at the property 410, a dog sitter taking care of a dog at the property 410, a cleaning service cleaning the property 410, an inspector inspecting something at the property 410 or the property itself, an appraiser service appraising something at the property 410 or the property itself, a dog groomer grooming a dog at the property 410, a dog walker walking a dog at the property 410, a baby sitter babysitting a child at the property 410, a masseuse massaging someone at the property 410, a hair styling service styling hair at the property 410, a makeup artist doing makeup at the property 410, a laundry service picking up laundry at the property 410, or any person that visit the property or is frequently located near the property.

The fire detector cloud database 340 may be a remote computer server that includes a processor 342 and an associated memory 344 comprising computer-executable instructions (i.e., computer program product) that, when executed by the processor 342, cause the processor 342 to perform various operations. The processor 342 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 344 may be but is not limited to a random access memory (RAM), read only memory (ROM), or other electronic, optical, magnetic or any other computer readable medium.

The fire detector cloud database 340 also includes a communication device 346. The communication device 346 may be capable of hard wired communication or wireless communication including but not limited to Wi-Fi, Bluetooth, BLE, Ultra-Wideband, Zigbee, Z-Wave, Sub-GHz RF Channel, cellular, satellite, or any other wireless signal known to one of skill in the art. The communication device 346 may be configured to communicate with the occupant computing device 500, the trusted individual computing device 600, and the controller 330 of the fire detector 310 through the internet 306. This communication may occur through local Wi-Fi routers 308, a satellite connection, a cellular connection, hardline connection, or any other internet connection method known to one of skill in the art.

The occupant computing device 500 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

The occupant computing device 500 includes a controller 510 configured to control operations of the occupant computing device 500. The controller 510 may be an electronic controller including a processor 530 and an associated memory 520 comprising computer-executable instructions (i.e., computer program product) that, when executed by the processor 530, cause the processor 530 to perform various operations. The processor 530 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 520 may be but is not limited to a random access memory (RAM), read only memory (ROM), or other electronic, optical, magnetic or any other computer readable medium.

The occupant computing device 500 includes a communication device 540 configured to communicate with the internet 306 through one or more wireless signals. The one or more wireless signals may include Wi-Fi, Bluetooth, BLE, Ultra-Wideband, Zigbee, Z-Wave, Sub-GHz RF Channel, cellular, satellite, or any other wireless signal known to one of skill in the art. The occupant computing device 500 is configured to communicate with the fire detector cloud database 340 through the internet 306. Alternatively, the occupant computing device 500 may be connected to the internet 306 through a hardwired connection. The occupant computing device 500 may be configured to communicate directly with the fire detector 310 through a short-range wireless signal 360, including, but not limited to, Wi-Fi, Bluetooth, BLE, Ultra-Wideband, Zigbee, Z-Wave, Sub-GHz RF Channel, or any other wireless communication method known to one of skill in the art.

The occupant computing device 500 may include a display device 580, such as for example a computer display, an LCD display, an LED display, an OLED display, a touchscreen of a smart phone, tablet, or any other similar display device known to one of the skill in the art. A user operating the occupant computing device 500 is able to view the first computer application 550 through the display device 580.

The occupant computing device 500 includes an input device 570 configured to receive a manual input from a user (e.g., human being) of computing device 500. The input device 570 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the occupant computing device 500, or any similar input device known to one of skill in the art. The user operating the occupant computing device 500 is able to enter data into the first computer application 550 through the input device 570. The input device 570 allows the user operating the occupant computing device 500 to data into the first computer application 550 via a manual input to input device 570. For example, the user may respond to a prompt on the display device 580 by entering a manual input via the input device 570. In one example, the manual input may be a touch on the touchscreen. In an embodiment, the display device 580 and the input device 570 may be combined into a single device, such as, for example, a touchscreen.

The occupant computing device 500 may also include a feedback device 560. The feedback device 560 may activate in response to a manual input via the input device 570. The feedback device 560 may be a haptic feedback vibration device and/or a speaker emitting a sound. The feedback device 560 may activate to confirm that the manual input entered via the input device 570 was received via the first computer application 550. For example, the feedback device 560 may activate by emitting an audible sound or vibrate the occupant computing device 500 to confirm that the manual input entered via the input device 570 was received via the first computer application 550.

The occupant computing device 500 may also include a location determination device 590 that may be configured to determine a location of the occupant computing device 500 using cellular signal triangulation, a global position satellite (GPS), or any location termination method known to one of skill in the art.

The trusted individual computing device 600 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

The trusted individual computing device 600 includes a controller 610 configured to control operations of the trusted individual computing device 600. The controller 610 may be an electronic controller including a processor 630 and an associated memory 620 comprising computer-executable instructions (i.e., computer program product) that, when executed by the processor 630, cause the processor 630 to perform various operations. The processor 630 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 620 may be but is not limited to a random access memory (RAM), read only memory (ROM), or other electronic, optical, magnetic or any other computer readable medium.

The trusted individual computing device 600 includes a communication device 640 configured to communicate with the internet 306 through one or more wireless signals. The one or more wireless signals may include Wi-Fi, Bluetooth, BLE, Ultra-Wideband, Zigbee, Z-Wave, Sub-GHz RF Channel, cellular, satellite, or any other wireless signal known to one of skill in the art. The trusted individual computing device 600 is configured to communicate with the fire detector cloud database 340 through the internet 306. Alternatively, the trusted individual computing device 600 may be connected to the internet 306 through a hardwired connection. The trusted individual computing device 600 may be configured to communicate directly with the fire detector 310 through a wireless signal including, but not limited to, Wi-Fi, Bluetooth, BLE, Ultra-Wideband, Zigbee, Z-Wave, Sub-GHz RF Channel or any other wireless communication method known to one of skill in the art.

The trusted individual computing device 600 may include a display device 680, such as for example a computer display, an LCD display, an LED display, an OLED display, a touchscreen of a smart phone, tablet, or any other similar display device known to one of the skill in the art. A user operating the trusted individual computing device 600 is able to view the second computer application 650 through the display device 680.

The trusted individual computing device 600 includes an input device 670 configured to receive a manual input from a user (e.g., human being) of computing device 600. The input device 670 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the trusted individual computing device 600, or any similar input device known to one of skill in the art. The user operating the trusted individual computing device 600 is able to enter data into the second computer application 650 through the input device 670. The input device 670 allows the user operating the trusted individual computing device 600 to data into the second computer application 650 via a manual input to input device 670. For example, the user may respond to a prompt on the display device 680 by entering a manual input via the input device 670. In one example, the manual input may be a touch on the touchscreen. In an embodiment, the display device 680 and the input device 670 may be combined into a single device, such as, for example, a touchscreen.

The trusted individual computing device 600 may also include a feedback device 660. The feedback device 660 may activate in response to a manual input via the input device 670. The feedback device 660 may be a haptic feedback vibration device and/or a speaker emitting a sound. The feedback device 660 may activate to confirm that the manual input entered via the input device 670 was received via the second computer application 650. For example, the feedback device 660 may activate by emitting an audible sound or vibrate the trusted individual computing device 600 to confirm that the manual input entered via the input device 670 was received via the second computer application 650.

The trusted individual computing device 600 may also include a location determination device 690 that may be configured to determine a location of the trusted individual computing device 600 using cellular signal triangulation, a global position satellite (GPS), or any location termination method known to one of skill in the art.

In order for a trusted individual 404 to have the ability receive alarms from the fire detector 310 and/or the ability to hush a fire detector 310, the occupant 402 must first opt-in to granting trusted individuals 404 access to the fire detector 310 of the property 410. In order to opt-in, the occupant 402 may transmit trusted individual opt-in information 370 to the fire detector cloud database 340. The occupant 402 may transmit the trusted individual opt-in information 370 to the fire detector cloud database 340 via the first computer application 550 using the occupant computing device 500.

The occupant 402 may transmit the trusted individual opt-in information 370 and the trusted individual opt-in information 370 may be stored in the fire detector cloud database 340. The occupant 402 may transmit the trusted individual opt-in information 370 when, shortly after, or after the fire detector 310 is installed on the property 410, the property 410 changes occupants 402, or whenever the occupant 402 desires to add on a trusted individual 404.

The trusted individual opt-in information 370 may include an access grant 372 by the occupant 402 to the fire detector 310, location information 374 of the fire detector 310 and/or the property 410, and identification information 376 of the fire detector 310. The access grant 372 is authorization from the occupant 402 for the fire detector provider 406 to grant a trusted individual 404 access to control the fire detector 310 of the property 410. Control by the trusted individual 404 of the fire detector 310 may be limited to only submitting a hush request 384 to the fire detector 310 and receiving alerts 388. Even further, control by the trusted individual 404 of the fire detector 310 may be limited to only submitting a hush request 384 to the fire detector 310 only after an alarm is transmitted from the fire detector 310 to the trusted individual computing device 600. The access grant 372 may include time restrictions on when the trusted individual 404 may transmit hush requests 384 and for how long the trusted individual 404 has permission to transmit hush requests 384.

The access grant 372 may include a credential 373 for the fire detector 310 that will allow a trusted individual 404 to gain access to the fire detector 310 to receive alerts 388 from the fire detector 310 and/or transmit hush requests 384. The trusted individual 404 may only have access to utilization of the credential 373 for a limited period of time as designated by the access grant 372. The credentials 373 are managed between the occupant computing device 500, the trusted individual computing device 600, and the fire detector cloud database 340. The fire detector cloud database 340 controls the access to the alerts 388 and hush request 384 to the fire detectors 310

Alternatively, or additionally, the trusted individual 404 may have to register with the fire detector cloud database 340 by submitting a registration request 386. The occupant 402 may select a specific trusted individual 404 through the first computer application 550 or in order to transmit the trusted individual opt-in information 370. The registration request 386 may include any details on the background of the trusted individual 404 including, a name of the trusted individual, identification information regarding the trusted individual computing device 600, a phone number of the trusted individual computing device 600, or any other similar information. The location information 374 may be any location information used to find the property 410 and fire detector 310, such as, for example, a street address, a location address, an apartment number, a storage unit number, a lock box number, a post office box number, a parking space, a GPS location, a parking garage name/floor, or any other location information known to one of skill in the art.

The identification information 376 may include information about the fire detector 310, including, but not limited to, a model number, a serial number, or any identification (ID) of the fire detector 310.

The access grant 372 may grant access to trusted individuals 404 for a limited period of time or an opened ended period of time. For example, the limited period of time may be a specific time of day when a person may be cleaning a home. In another example, an opened ended period of time may be for a period when a house is listed for sale, showing real-estate agents may register with the fire detector provider 406 and then may have the ability to transmit a hush request 384 to the fire detector 310 when they are showing the property 410.

Figure 2:
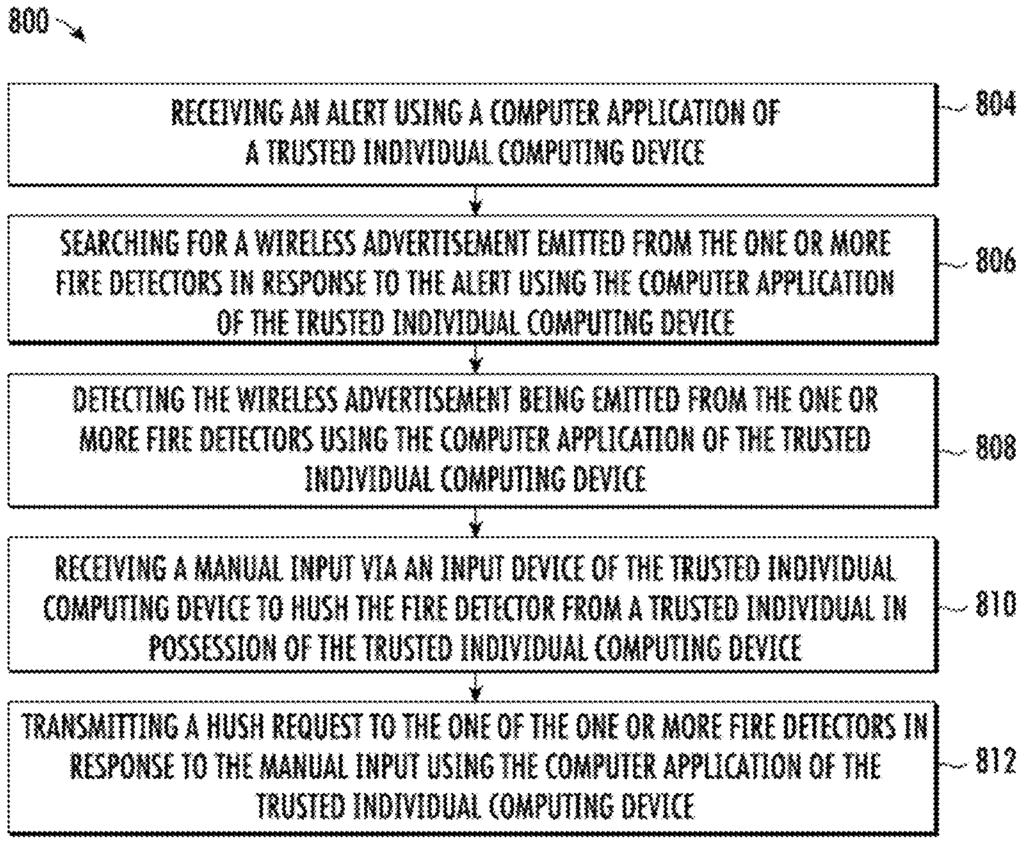
FIG. 2 is a flow process illustrating a method of hushing one or more fire detectors of a fire detector system is illustrated, according to an embodiment of the present disclosure.

Referring to FIG. 2, within continued references to FIGS. 1-2, a flow diagram illustrating a method 800 of hushing one or more fire detectors 310 of a fire detector system 300 is illustrated, in accordance with an embodiment of the present disclosure. In an embodiment, the method 800 may be performed by the computer application 650 of a trusted individual computing device 600.

At block 804, an alert 388 is received using a computer application 650 of a trusted individual computing device 600. The alert 388 may be received over a first wireless channel/medium. The alert 388 indicating that fire has been detected by at least one of the one or more fire detectors 310. The one or more fire detectors 310 may start emitting a wireless advertisement 382 after the alert 388.

If there is more than one fire detector 310, the first fire detector 310 may communicate the alert to one or more fire detectors 310 over a wired and/or wireless connection 310, and then the one or more fire detectors may start a wireless advertisement 382 over a second wireless channel.

At block 806, the computer application 650 of the trusted individual computing device 600 searches for a wireless advertisement 382 emitted from the one or more fire detector 310 in response to the alert 388.

A block 808, the computer application 650 of the trusted individual computing device 600 detects a wireless advertisement 382 being emitted from the one or more fire detectors 310. In an embodiment, the wireless advertisement 382 is emitted from the one or more fire detectors 310 using a short-range wireless signal 360. In an embodiment, the short-range wireless signal 360 is Bluetooth or BLE.

A hush option may be enabled or disabled on the computer application 650 of the trusted individual 404 based on the computer application 650 of the trusted individual computing device 600 detecting the wireless advertisement 382. The hush option allows the trusted individual 404 to hush the fire detector 310 using the computer application 650.

At block 810, the computer application 650 of the trusted individual computing device 600 receives a manual input via an input device 670 of the trusted individual computing device 600 to hush the fire detector 310 from a trusted individual 404 in possession of the trusted individual computing device 600.

At block 812, the computer application 650 of the trusted individual computing device 600 transmits a hush request 384 to the one of the one or more fire detectors 310 in response to the manual input. In an embodiment, a hush request 384 is transmitted via an internet 306. The hush request 384 may be transmitted via a Wi-Fi connection to the internet 306 or a cellular connection to the internet 306. The hush request 384 is configured to silence an alarm that is being audibly or visually emitted by the one or more fire detectors 310.

The method 800 may further comprise that the computer application 650 of the trusted individual computing device 600 receives authority from an occupant 404 of a property 410 where the one or more fired fire detectors 310 are located to receive the alert 388 and transmit the hush request 384. The occupant 402 of the property 410 has granted authority to the trusted individual 404 in possession of the trusted individual computing device 600 to receive the alert 388 and transmit the hush request 384.

While the above description has described the flow process of FIG. 2 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of hushing one or more fire detectors of a fire detector system, the method comprising:

receiving an alert using a computer application of a trusted individual computing device, the alert indicating that fire has been detected by at least one of the one or more fire detectors;

searching for a wireless advertisement emitted from the one or more fire detectors in response to the alert using the computer application of the trusted individual computing device;

detecting the wireless advertisement being emitted from the one or more fire detectors using the computer application of the trusted individual computing device;

receiving a manual input via an input device of the trusted individual computing device to hush the fire detector from a trusted individual in possession of the trusted individual computing device; and transmitting a hush request to the one of the one or more fire detectors in response to the manual input using the computer application of the trusted individual computing device.

2. The method of claim 1, wherein the wireless advertisement is emitted from the one or more fire detectors using a short-range wireless signal.

3. The method of claim 2, wherein the short-range wireless signal is Bluetooth or Bluetooth Low Energy.

4. The method of claim 1, wherein the hush request is transmitted via an internet.

5. The method of claim 4, wherein the hush request is transmitted via a Wi-Fi connection to the internet or a cellular connection to the internet.

6. The method of claim 1, wherein the hush request is configured to silence an alarm that is being audibly or visually emitted by the one or more fire detectors.

7. The method of claim 1, further comprising: receiving authority from an occupant of a property where the one or more fire detectors are located to receive the alert and transmit the hush request, wherein the occupant of the property has granted the authority to the trusted individual in possession of the trusted individual computing device to receive the alert and transmit the hush request.

8. A fire detector system having one or more fire detectors, the fire detector system comprising:

a processor; and a memory comprising computer-executable instructions that, when executed by the processor, cause the processor to perform operations, the operations comprising:

receiving an alert using a computer application of a trusted individual computing device, the alert indicating that fire has been detected by at least one of the one or more fire detectors;

searching for a wireless advertisement emitted from the one or more fire detectors in response to the alert using the computer application of the trusted individual computing device;

detecting the wireless advertisement being emitted from the one or more fire detectors using the computer application of the trusted individual computing device;

receiving a manual input via an input device of the trusted individual computing device to hush the fire detector from a trusted individual in possession of the trusted individual computing device; and transmitting a hush request to the one of the one or more fire detectors in response to the manual input using the computer application of the trusted individual computing device.

9. The fire detector system of claim 8, wherein the wireless advertisement is emitted from the one or more fire detectors using a short-range wireless signal.

10. The fire detector system of claim 9, wherein the short-range wireless signal is Bluetooth or Bluetooth Low Energy.

11. The fire detector system of claim 8, wherein the hush request is transmitted via an internet.

12. The fire detector system of claim 11, wherein the hush request is transmitted via a Wi-Fi connection to the internet or a cellular connection to the internet.

13. The fire detector system of claim 8, wherein the hush request is configured to silence an alarm that is being audibly or visually emitted by the one or more fire detectors.

14. The fire detector system of claim 8, wherein the operations further comprise: receiving authority from an of a property where the one or more fired detectors are located to receive the alert and transmit the hush request, wherein the occupant of the property has granted the authority to the trusted individual in possession of the trusted individual computing device to receive the alert and transmit the hush request.

15. A computer program product tangibly embodied on a non-transitory computer readable medium, the computer program product including instructions that, when executed by a processor, cause the processor to perform operations comprising:

receiving an alert using a computer application of a trusted individual computing device, the alert indicating that fire has been detected by at least one of one or more fire detectors;

searching for a wireless advertisement emitted from the one or more fire detectors in response to the alert using the computer application of the trusted individual computing device;

detecting the wireless advertisement being emitted from the one or more fire detectors using the computer application of the trusted individual computing device;

receiving a manual input via an input device of the trusted individual computing device to hush the fire detector from a trusted individual in possession of the trusted individual computing device; and transmitting a hush request to the one of the one or more fire detectors in response to the manual input using the computer application of the trusted individual computing device.

16. The computer program product of claim 15, wherein the wireless advertisement is emitted from the one or more fire detectors using a short-range wireless signal.

17. The computer program product of claim 16, wherein the short-range wireless signal is Bluetooth or Bluetooth Low Energy.

18. The computer program product of claim 15, wherein the hush request is transmitted via an internet.

19. The computer program product of claim 18, wherein the hush request is transmitted via a Wi-Fi connection to the internet or a cellular connection to the internet.

20. The computer program product of claim 15, wherein the hush request is configured to silence an alarm that is being audibly or visually emitted by the one or more fire detectors.

* * * * *